(12) United States Patent
Huang et al.

(10) Patent No.: US 11,947,966 B2
(45) Date of Patent: Apr. 2, 2024

(54) IDENTIFYING COMPUTER INSTRUCTIONS ENCLOSED BY MACROS AND CONFLICTING MACROS AT BUILD TIME

(71) Applicant: International Business Machines Corporation, Armonk, NY (US)

(72) Inventors: Wen Ji Huang, Beijing (CN); Xiao Ling Chen, Beijing (CN); Wen Bin Han, Beijing (CN); Sheng Shuang Li, Beijing (CN); Xiao Zhen Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 17/498,141

(22) Filed: Oct. 11, 2021

(65) Prior Publication Data
US 2023/0115334 A1  Apr. 13, 2023

(51) Int. Cl.
*G06F 9/30* (2018.01)
*G06F 8/41* (2018.01)
*G06F 9/445* (2018.01)

(52) U.S. Cl.
CPC .............. *G06F 9/3017* (2013.01); *G06F 8/41* (2013.01); *G06F 9/44521* (2013.01); *G06F 9/44552* (2013.01)

(58) Field of Classification Search
None
See application file for complete search history.

(56) References Cited

U.S. PATENT DOCUMENTS

| | | | |
|---|---|---|---|
| 4,947,315 A * | 8/1990 | Sokolow | G06F 9/4843 700/86 |
| 5,946,488 A | 8/1999 | Tanguay et al. | |
| 6,003,143 A | 12/1999 | Kim et al. | |
| 6,199,200 B1 * | 3/2001 | Acker | G06F 9/4484 712/E9.082 |

(Continued)

FOREIGN PATENT DOCUMENTS

| | | |
|---|---|---|
| CN | 101968767 A | 2/2011 |
| JP | 2003005959 A | 1/2003 |

OTHER PUBLICATIONS

Mennie et al., "Giving Meaning to Macros," IEEE, 2004, 10pg. (Year: 2004).*

(Continued)

*Primary Examiner* — Ryan D. Coyer
(74) *Attorney, Agent, or Firm* — CANTOR COLBURN LLP; Teddi Maranzano

(57) ABSTRACT

A computer-implemented method includes preprocessing, by a compiler, a plurality of macros in a computer program. Preprocessing a macro includes identifying a compile time condition associated with the macro. Preprocessing the macro further includes determining a current value of the compile time condition at the time of compiling a computer instruction and a previous value of the compile time condition. Preprocessing the macro further includes determining a set of computer instructions enclosed by the macro. The method further includes storing a macro information record that includes the compile time condition, the current value and the previous value of the compile time condition, and an identification of the set of computer instructions enclosed by the macro.

20 Claims, 15 Drawing Sheets

(56) References Cited

U.S. PATENT DOCUMENTS

| | | | |
|---|---|---|---|
| 7,337,438 | B1 | 2/2008 | Dobbins et al. |
| 7,571,431 | B2 | 8/2009 | Hampapuram et al. |
| 7,774,763 | B1 * | 8/2010 | Robillard ............... G06F 8/458 717/136 |
| 7,810,080 | B2 | 10/2010 | Plum et al. |
| 9,378,014 | B2 | 6/2016 | Wilson et al. |
| 9,569,184 | B2 | 2/2017 | Tejani et al. |
| 10,802,825 | B2 | 10/2020 | Guan et al. |
| 2003/0033588 | A1 | 2/2003 | Alexander |
| 2003/0105620 | A1 | 6/2003 | Bowen |
| 2004/0193957 | A1 | 9/2004 | Swoboda et al. |
| 2007/0011669 | A1 | 1/2007 | Varma et al. |
| 2013/0139132 | A1 | 5/2013 | Kass et al. |
| 2014/0189662 | A1 | 7/2014 | Mameri et al. |
| 2015/0033202 | A1 | 1/2015 | Wilson et al. |
| 2015/0058832 | A1 | 2/2015 | Gonion |
| 2016/0062753 | A1 | 3/2016 | Champagne |
| 2017/0017747 | A1 * | 1/2017 | Cho ..................... G06F 30/30 |
| 2017/0161062 | A1 | 6/2017 | Banerjee et al. |
| 2017/0192758 | A1 | 7/2017 | Apte et al. |
| 2017/0344349 | A1 | 11/2017 | He et al. |
| 2020/0192662 | A1 | 6/2020 | Hu |
| 2020/0371906 | A1 | 11/2020 | Tertzakian et al. |
| 2022/0206769 | A1 | 6/2022 | Johnson et al. |

OTHER PUBLICATIONS

Padioleau, Yoann, "Parsing C/C++ Code without Pre-Processing," Springer, 2009, 17pg. (Year: 2009).*

Anonymous, "Method to Enable Macros Debugging," IP.com Prior Art Database Technical Disclosure, IPCOM000202015D, Dec. 1, 2010, pp. 1-6.

Graebner et al., "Generating SAS Source Code with SAS Macros," Pharmaceutical Research Associates, Inc.; Coders' Corner; URL: https://support.sas.com/resources/papers/proceedings/proceedings/sugi23/Coders/p81.pdf; Retrieved: Jul. 2021; pp. 1-2.

Huang et al., "Checking Source Code Validity At Time of Code Update," U.S. Appl. No. 17/498,138, filed Oct. 11, 2021.

IBM: List of IBM Patents or Patent Applications Treated as Related (Appendix P); Date Filed: Oct. 11, 2021; 2 pages.

Overbey et al., "A Foundation for Refactoring C with Macros," In Proceedings of the 22nd ACM SIGSOFT International Symposium on Foundations of Software Engineering (FSE 2014), Nov. 16-21, 2014, pp. 75-85.

Woods, "A Framework for the Assessment of Knowledge Transfer in Software Development Organization," Massachusetts Institute of Technology, May 2001, 85 pages.

K. A. Lindlan et al; "A Tool Framework for Static and Dynamic Analysis of Object-Oriented Software with Templates;" IEEE/ACMSC2000 Conference; 11 pages.

T. Chiueh et al.; "RAD: A Compile-Time Solution to Buffer Overflow Attacks;" IEEE 2001; 9 pages.

Braz et al., A Change-Centric Approach to Compile Configurable Systems with #ifdefs, ACM SIGPLAN Notices, Association for Computing Machinery, vol. 52, No. 3, Oct. 2016, pp. 109-119.

Devai et al., "Service Layer for IDE Integration of C/C++ Preprocessor Related Analysis," Computational Science and Its Applications, Lecture Notes in Computer Science, 2015, 16 pages.

International Search Report and Written Opinion; dated Jan. 25, 2023; Application No. PCT/EP2022/077948; Filed: Oct. 7, 2022; 17 pages.

Ernst et al., "An Empirical Analysis of C Preprocessor Use," IEEE Transaction on Software Engineering, vol. 28, No. 12, Dec. 2002, pp. 1146-1170.

Kästner et al., "Variability-aware parsing in the presence of lexical macros and conditional compilation," Proceedings of the 2011 ACM International Conference on Object Oriented Programming Systems and Languagues and Application, 2011, pp. 805-824.

* cited by examiner

IDENTIFYING COMPUTER INSTRUCTIONS ENCLOSED BY MACROS AND CONFLICTING MACROS AT BUILD TIME

BACKGROUND

The present invention generally relates to computer technology and, more specifically, to identify lines of computer instructions enclosed by macros in a source code of a computer program product that is being compiled.

Porting computer programs from one platform or source to another is important to enable the computer programs to be used on several platforms. For example, in the case of a cloud computing platform, several computer programs, such as open source programs are available to be used for particular functionality such as container support. Porting such computer programs from one platform (e.g., cloud computing platform, mobile computing platform, operating system, etc.) to another facilitates uninterrupted use of software that use such computer programs.

SUMMARY

According to one or more embodiments of the present invention, a computer-implemented method includes preprocessing, by a compiler, a plurality of macros in a computer program. Preprocessing a macro includes identifying a compile time condition associated with the macro. Preprocessing the macro further includes determining a current value of the compile time condition at the time of compiling a computer instruction and a previous value of the compile time condition. Preprocessing the macro further includes determining a set of computer instructions enclosed by the macro. The method further includes storing a macro information record that includes the compile time condition, the current value and the previous value of the compile time condition, and an identification of the set of computer instructions enclosed by the macro.

According to one or more embodiments of the present invention, a computer program product includes a computer-readable memory that has computer-executable instructions stored thereupon. The computer-executable instructions when executed by a processor cause the processor to perform a method for preprocessing a plurality of macros in a computer program. Preprocessing a macro includes identifying a compile time condition associated with the macro. Preprocessing the macro further includes determining a current value of the compile time condition at the time of compiling a computer instruction, and a previous value of the compile time condition. Preprocessing the macro further includes determining a set of computer instructions enclosed by the macro. Preprocessing the macro further includes storing a macro information record that includes the compile time condition, the current value and the previous value of the compile time condition, and an identification of the set of computer instructions enclosed by the macro.

According to one or more embodiments of the present invention, a system includes a memory device, and one or more processing units coupled with the memory device, the one or more processing units are configured to perform a method for preprocessing a plurality of macros in a computer program. Preprocessing a macro includes identifying a compile time condition associated with the macro. Preprocessing the macro further includes determining a current value of the compile time condition at the time of compiling a computer instruction, and a previous value of the compile time condition. Preprocessing the macro further includes determining a set of computer instructions enclosed by the macro. Preprocessing the macro further includes storing a macro information record that includes the compile time condition, the current value and the previous value of the compile time condition, and an identification of the set of computer instructions enclosed by the macro.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts an example expansion scenario of a macro during debugging according to one or more embodiments of the present invention;

FIG. 6 depicts an example scenario of detecting macro information 412 according to one or more embodiments of the present invention;

Figure 1:
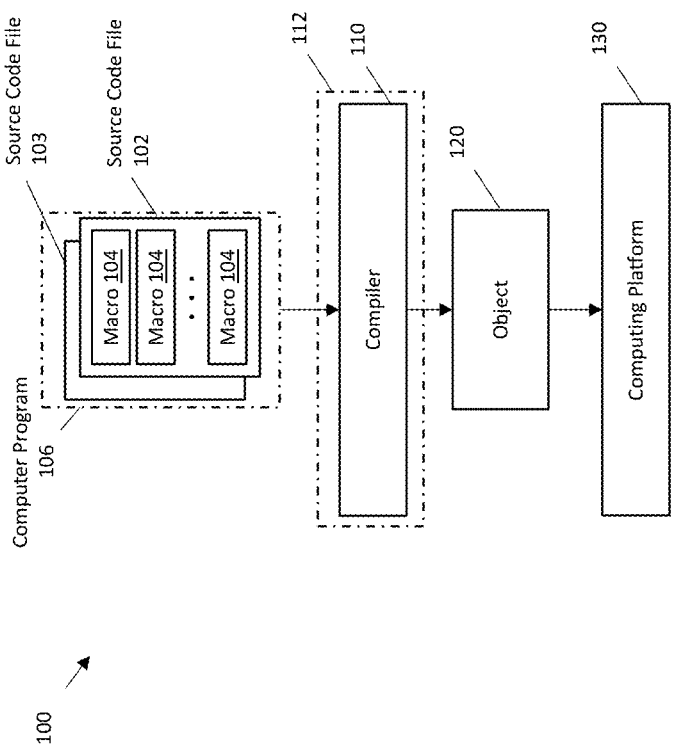
FIG. 1 depicts a system for identifying computer instructions enclosed by macros according to one or more embodiments.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Technical solutions are described herein to identify, in a computer program, computer instructions that are enclosed by macros. For a computing platform, it is a technical challenge to maintain a robust ecosystem that allows execution of computer programs that are available on other computing platforms, for example, competitor platforms, open source platforms, etc. For example, the computer programs can include libraries, tools, etc. that computer software/hardware developers ("developers") desire to execute as part of, or to support their computer program. To facilitate execution of such computer programs, the computer program instructions (i.e., source code, code, executable instructions, etc.) of such computer programs have to be compiled for the particular computing platform.

Typically, computer programs include one or more macros. In computer programming, macros are a tool that allows a developer to re-use instructions. A macro is generally a rule or pattern that specifies how a certain input should be mapped to an output. The input and output may be a sequence of lexical tokens or characters, or a syntax tree. In programming languages, such as C/C++, a macro is often used to enclose computer program instructions, which are to be compiled only when certain condition(s) is met. Using a macro can make the source code of the computer program compact and avoid duplication efforts. However, the use of macro makes it technically challenging to parse the source code. Further, debugging the source code is also made technically challenging by use of macros.

Checking if computer instructions enclosed by a macro have been included (i.e., macro has been expanded) in an object file (result of compilation) is a technical challenge. This is because, for example, the definition of a macro can be included in a separate file from the file that actually includes (or uses) the macro. Alternatively, or in addition, the macro expansion can be overridden if the source code is compiled with specific runtime option (i.e., when the compiler is executed to compile the source code). Moreover, in enterprise level projects, the source code can be complicated, and can include several (hundreds) directories and (thousands) files in different hierarchy. Determining a macro defined in one of these files, which is then used in another can be a parsing challenge. Further, there can be different macros with the same macro name, but different instructions enclosed. This situation can be exacerbated because of the hierarchy. For example, multiple files can include respective macros with the same name, and a file, say file F1, can include two or more of such macro-defining files. Accordingly, it can be challenging to predict which of the macros was expanded at the time of compiling file F1.

In turn, the technical challenge of unpredictability of macro expansion makes it technically challenging to debug the computer programs that include macros. Accordingly, porting computer programs, such as open source computer programs, to a target computing platform is technically challenging. In addition, several tools such as aclocal, autoconfig, automake, libtool (all are libraries as part of GNU PROJECT®), MESON™ build system, NINJA™ build system, etc. can make the macros configuration and the root cause analyzing/locating (i.e., debugging) more complicated.

For example, consider computer programs developed using the C programming language. It should be understood that the technical challenges described herein may not be limited to particular programming languages. In the case of C, it can be difficult to make a software program portable because the C compiler differs from system to system. Alternatively, or in addition, certain library functions can be missing on some systems. Alternatively, or in addition, header files can have different names. To handle such challenges with portability, programmers generally use conditional code, with code blocks selected by means of preprocessor directives (#ifdef). For example, these preprocessor directives instruct the compiler to only compile certain portions of the computer program if the target system satisfies certain conditions, such as availability of library functions, etc. But because of the wide variety of systems, and build environments this approach can becomes unmanageable and hence, technical challenging.

Certain existing tools, such as AUTOTOOLS® are designed to address this problem more manageably. For example, AUTOTOOLS® includes settings/configuration such as autoheader, autoconf, automake etc., which are used to assume or generate intermediate files such as, configure.ac, Makefile.in, Makefile.am, aclocal.m4, etc. Such tools (e.g., AUTOTOOLS®, LIBTOOLS®, etc.) analyze the operating system, compiler options, etc., and collect and generate the macros definition or macros conditional code automatically. However, the existing tools make the code debugging more complicated because they add several macros and preprocessor directives (i.e., compile time conditions) for the various platforms/compilers to support. Additionally, such tools handle some cross-platform support without explicit knowledge of the user making it difficult for the user to debug the computer program in case of a failure.

Additionally, at present, existing solutions can facilitate pre-processing, for example compiling with a particular option (e.g., gcc with option "-E") to generate one intermediate file which will expand all the macro, and also incorporate all the contents of included files. However, generating such an intermediary file can take a long time (hours) particularly in the case of large projects (thousands of lines of code). Further, such an intermediate file is not easily readable. For example, one source code file with 303 lines can expand to the intermediate file with 7148 lines.

Also, there are tools available such as VSCODE, that can analyze the source code and identify if one specific macro is defined or not within the file. Some existing tools can also change the visual representation of computer instructions enclosed by a macro, for example different color (e.g., grey) font, if the definition of the macro is not located in the same file as the file that is using the macro.

However, these methods are based on static analysis of the source code (i.e., they are unable to resolve the definition of macro in another file). Hence, the result is not accurate in many scenarios especially. For example, macros that are defined in included files or overridden in compiling options are commonly misidentified by such tools.

Embodiments of the present invention provide technical solutions to address such technical challenges with improvements over the existing tools. Embodiments of the present invention are rooted in computing technology, particularly identifying computer program instructions in computer programs (i.e., source code). Further, embodiments of the present invention are rooted in computing technology because, they improve debugging of computer programs (i.e., source code) that include macros. Embodiments of the present invention provide a practical application to identify macros and debug computer programs that include macros. Without using the embodiments of the present invention, such an analysis, particularly for large enterprise projects, can be impractical, or cause significant delays in development, debugging, testing, and release.

Embodiments of the present invention facilitate processing computer programs during compiling. The preprocessing information about computer instructions enclosed by a macro is recorded according to macro definition or compilation option. These records further facilitate to analyze/debug the computer programs to check if the computer instructions have been compiled into object file (result of compiling). Because embodiments of the present invention generate records based on compiling options instead of analyzing static source code, a dynamic compiling or linking result is provided.

FIG. 1 depicts a system 100 for identifying computer instructions enclosed by macros according to one or more embodiments. The depicted system 100 includes a computer program 106 that is to be compiled by a compiler 110 to generate a corresponding object(s) 120. The compiler 110 can be part of a development tool 112, such as an integrated development environment (IDE). The object(s) 120 are executed on a target computing platform 130. The compiler 110 generates the object 120 specifically for the target computing platform 130 in one or more embodiments of the present invention. In one or more embodiments of the present invention, the compiler 110 includes a linker that generates executable instructions from the object code 120. It should be noted that while a compiler and linker can be separate tools, with separate runtime instructions, as used herein, "compiling" the computer program 106 can include compiling, linking, and any other operations that may be required to convert the computer instructions in the computer program 106 into machine instructions that are executable by the target computing platform 130.

The target computing platform 130 can be cloud computing platform architecture, an operating system, a processor architecture, or any other type of computing platform to which the computer program 106 is being ported. In other words, the computer program 106 may not have been developed (written) specifically for the target computing platform 130. The compilation by the compiler 110 facilitates executing the computer program 106 to be executed on the target computing platform 130. Alternatively, or in addition, the compiler 110 improves the efficiency of execution of the computer program 106 when executing on the target computing platform 130.

The computer program 106 can include multiple source code files, including, for example but not limited to, a source code file 102 ("file" 102), and a source code file 103 (file 103). The computer program 106 can be open source in some embodiments of the present invention. It is understood that the computer program 106 can include several (hundreds, thousands) of source code files, although only two of them are depicted here. Each of the source code files (102, 103) can include several computer instructions (lines of code), for example, hundreds, thousands, etc. In one or more embodiments of the present invention, the source code files of the computer program 106 are organized in a hierarchical manner, for example using a directory structure (not shown).

One or more of the source code files in the computer program 106 uses macros 104. For example, the source code file 102 includes several macros 104. The depicted macros 104 can each be an instance of different macros. Alternatively, or in addition, the macros 104 can be associated with a conditional expansion. The conditional expansion can be dependent on one or more configurations of the compiler 110, that a user (e.g., developer) can adjust prior to executing the compiler 110. Alternatively, or in addition, the conditional expansion can be dependent on one or more environmental settings of the computing platform 130 (e.g., operating system level variables, hardware type, etc.). Alternatively, or in addition, the conditional expansion can be dependent on runtime option that the user provides at time of execution of the compiler 110. Other dependencies of the conditional expansion can be used in other embodiments of the present invention. In one or more embodiments of the present invention, the macros 104 that are used in the file 102 can be defined in the file 102 itself, or any other file in the computer program 106, for example the file 103.

The development tool 112 includes a user interface that is used to interact with the source code files 102, 103. A user can navigate the directory structure, and perform operations such as add, delete, copy, paste, move, edit, etc. with the source code files of the computer program 106. The user interface displays the computer instructions of the computer program using one or more contextual visual attributes. For example, computer instructions contents of different types (e.g., conditional statements, function calls, variables, keywords, macros, etc.) can be displayed using different color, different fonts, or other such visual attributes. The visual representation of the computer instructions can be adjusted by the development tool 112 based on results of the various features of one or more embodiments of the present invention.

Figure 2:
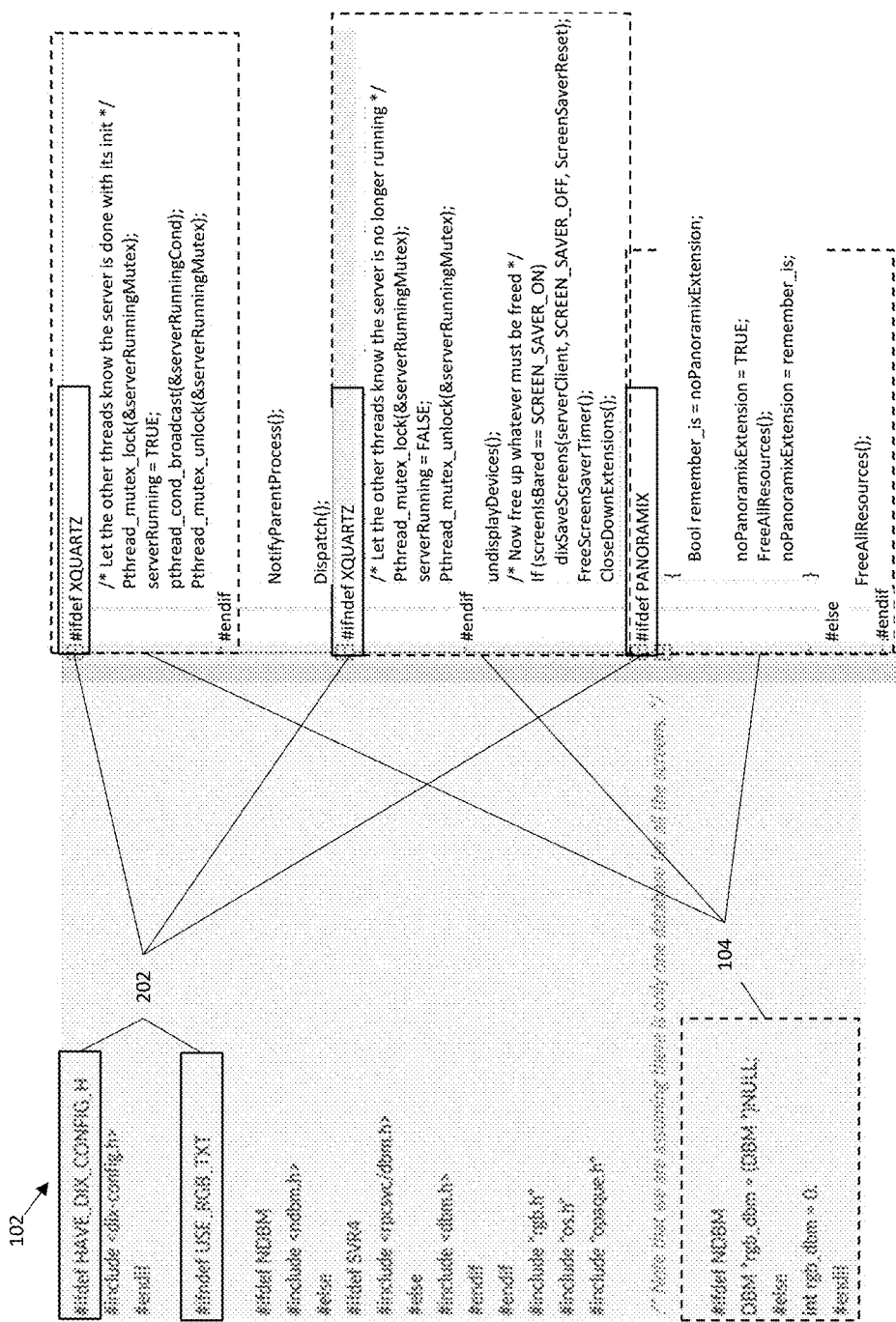
FIG. 2 depicts an example source code file according to one or more embodiments.

FIG. 2 depicts an example source code file 102 according to one or more embodiments. Portions of the source code file 102 are shown in two columns in FIG. 2; however, in some development tools, the source code file 102 may be rendered as a single column (i.e., boxes shown on the right in FIG. 2 may be in same column as the boxes shown on left in FIG. 2). The depicted file 102 includes several macros 104. It should be noted that all the macros in the file 102 are not marked in FIG. 2, and also that in other examples, the file 102 can include a different number of macros than those depicted. Further, the lines of code depicted in FIG. 2 can vary in other examples.

One or more of the macros 104 are conditional. A dynamic compile time condition 202 is associated with such conditional macros, such that the computer instructions in the conditional macros 104 are compiled (i.e., converted to object 120 code) only if the associated compile time condition 202 is satisfied. If the compile time condition 202 is not satisfied the computer instructions in the conditional macro 104 are not included in the object 120. The compile time conditions 202 can indicate a combination type of hardware and software of the target computing platform 130. For example, a compile time condition 202 can indicate that the macro 104 is to be expanded only if the platform uses a particular operating system such as, LINUX®, AIX®, INTERIX®, Z/OS®, etc. Alternatively, or in addition, the compile time condition 202 can indicate that the macro 104 is to be expanded only if one or more other source code files (e.g., a header file) is included. In some examples, the expanded macro 104 can itself be an inclusion of additional source code files, such as a library, an application programming interface, etc. Alternatively, or in addition, the expanded macro 104 can cause a particular type of hardware component or software component to be "mounted." Here, "mounting" includes acquiring access to the component, e.g., recognizing, reading, and processing a file system structure, a storage medium, etc., before registering the component for use. Several additional or alternative operations can be performed by the computer instructions enclosed in the macros 104 in one or more embodiments of the present invention.

Figure 3:
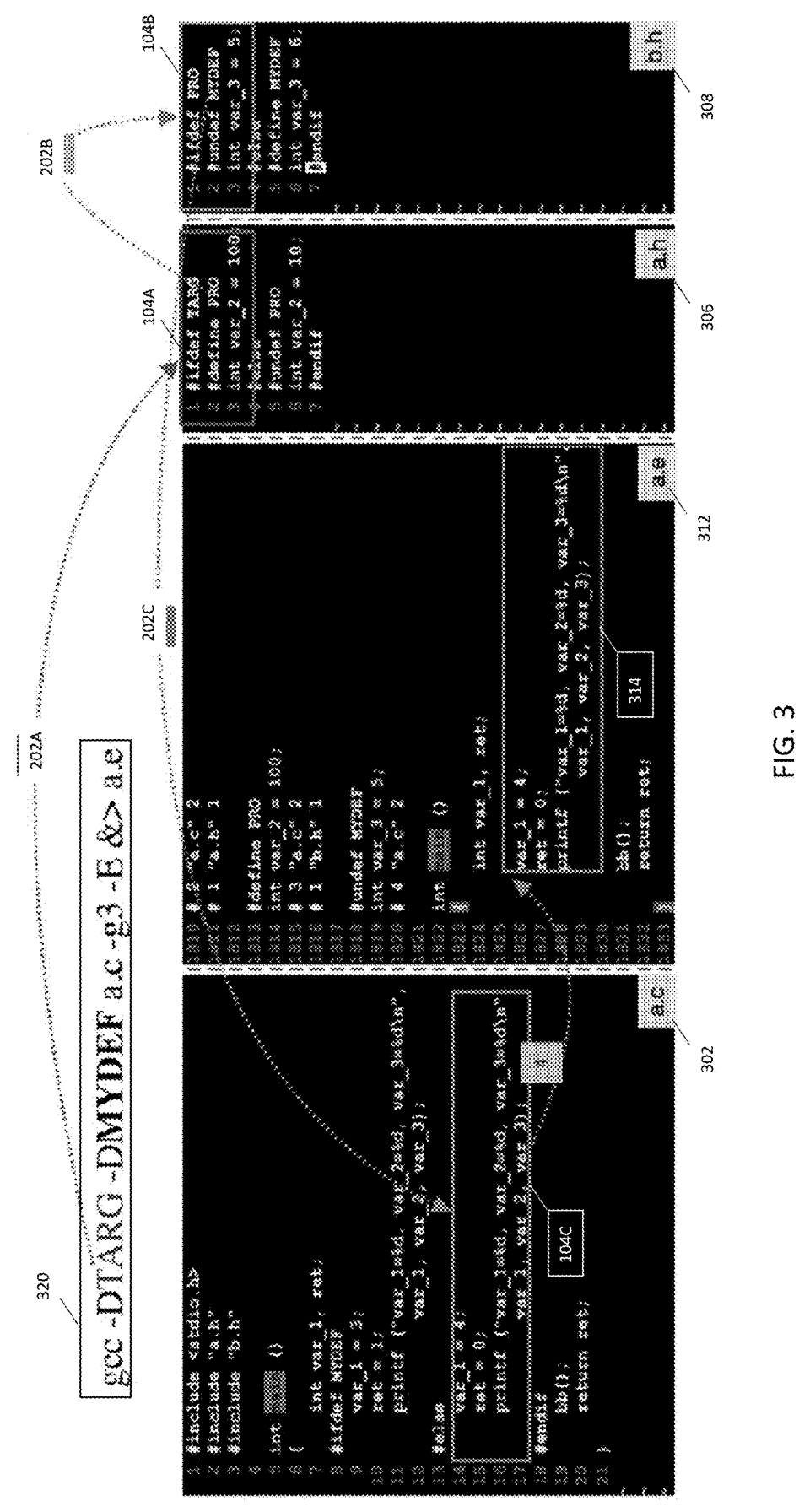

FIG. 3 depicts an example expansion scenario of a macro during debugging according to one or more embodiments of the present invention. In the depicted scenario, the macros TARG 104A, PRO 104B, MYDEF 104C are used. Consider that the computer instructions in the file 302 'a.c' lines 9-11 should be compiled because the compile time condition 202A of macro MYDEF 104C is defined in the runtime command 320 to initiate the compiler 110 to compile the files 302, 306, 308 into a preprocessed file 312. In the example in FIG. 3, the command 320 only runs the preprocessor of the compiler 110 and then exports the expanded macros and included files (e.g., a.h 306) information to the preprocessed file a.e 312. The preprocessed file 312 is used subsequently to generate the object code. However, the result of the compilation is not as expected as seen in the section 314, lines 1825-1830 of the preprocessed file 312. The reason is that the macro MYDEF 104C got undefined in the file 308 'b.h' line 2. The compile time conditions 202B and 202C cause the subsequent expansion of computer instructions in the object code 314 (rather than the desired compile time condition 202A). It can be appreciated that the example scenario here shows a scenario with very few lines of code; however, in large projects with thousands of lines of code, it is a technical challenge to determine such root causes of failures when porting a computer program.

Embodiments of the present invention provide technical solutions that facilitate detecting computer instructions that are enclosed in a macro 104, and further identifying the root cause of a conflict between an enclosed macro and an unenclosed macro. Alternatively, or in addition, embodiments of the present invention can identify macro redefinition paths across several source code files 102, 103, in the computer program 106 at the time of compiling. Alternatively, or in addition, one or more embodiments of the present invention facilitate representing (e.g., by highlighting, marking, etc.), in the development tool 112, the portions of the computer program 106 (e.g., lines of code) that were compiled into the object 120, the conflicted macros 104, and macro redefinition paths. In one or more embodiments of the present invention, one or more portions of the computer program 106, such as macros 104, are annotated using predetermined annotations such as, MacroEnclosed, CurrentMacroValue, Preprocesstype, EarlierAssignedMacroValue, etc. In one or more embodiments of the present invention, values are assigned to the predetermined set of variables, such as MacroEnclosed, CurrentMacroValue, Preprocesstype, EarlierAssignedMacroValue, etc. The assigned values are used to facilitate represent the computer program 106 in a more readable manner. Further, the values are used to facilitate the user to perform root cause analysis in case of an error.

Further, in one or more embodiments of the present invention, a preprocessor collects and identifies and generates records of the computer instructions that are enclosed (and not enclosed) in macros 104. Further, the compiler 110 supports macro definition conflict by comparing compile time conditions 202 MacroEnclosed and CurrentMacroValue, to identify the impact on the corresponding macros 104. The compiler (and/or linker) 110 supports a macro redefinition path across source code files 102, 103 by locating the macro enclosed records with MacroEnclosed 'ON' and runtime options, such as Preprocesstype 'D', to compare AssignedMacroValue and EarlierAssignedMacroValue across the different files. Accordingly, one or more embodiments of the present invention facilitates to analyze and identify the root cause of a macro conflict which can cause computer instructions to be compiled (or not) into the object 120 file, and also provide macro redefinition warning across several source code files.

Figure 4:
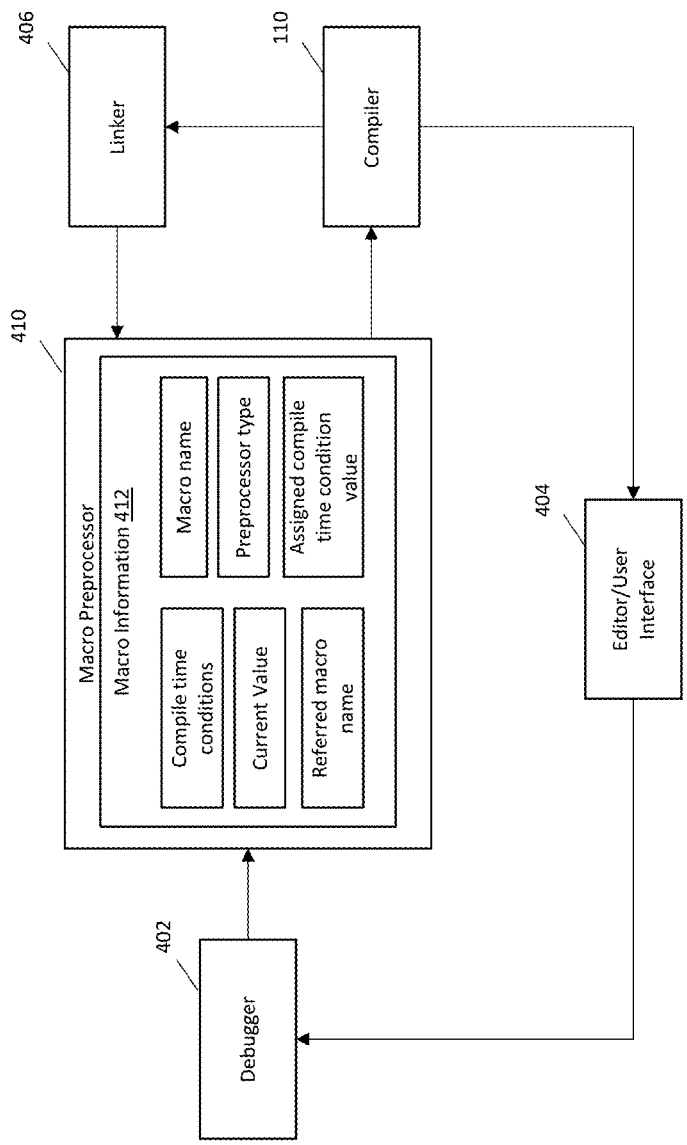
FIG. 4 depicts an example structure of a development tool according to one or more embodiments of the present invention.

FIG. 4 depicts an example structure of a development tool according to one or more embodiments of the present invention. The development tool 112 facilitates identifying macros 104, compile time conditions 202, values of the compile time conditions 202, updating the user interface, debugging the computer program 106, and various other features of the technical solutions described herein. The architecture of the system 400 includes a debugger 402 that receives a command to initiate identifying macros in the computer program 106. The command can be provided via a command-line, a setting configuration, or any other user interaction by the user.

The development tool 112 also includes a macro preprocessor 410 that generates macro information 412 by analyzing the source code files of the computer program 106. The macro information 412 can include the compile time conditions 202, current values of the compile time conditions, assigned compile time condition values, macro names, preprocessor type, referred macro names, etc. The preprocessor type 'S' marks the source code scope enclosed by the macro; whereas 'D' marks the definition of macros. Other preprocessor types can be specified in other embodiments of the present invention. ReferredMacroName specifies a macro name to be used in macro condition during the preprocessing.

The development tool 112 also includes an editor 404, for example, a graphical user interface (GUI). The editor 404 facilitates viewing and/or editing filenames, computer instructions in the files, line numbers of the computer instructions, macro names, compile time conditions 202, attributes of the compile time conditions 202 (e.g., type of value (e.g., integer, character, time, binary, etc.), condition to check, threshold to check, etc.), visual attributes (e.g., color, highlights, font size, font type, etc.), etc.

In addition, the development tool 112 includes the compiler 110 and the linker 406, which convert the computer program 106 into object code 120 and machine executable instructions for the target computing platform 130. In one or more embodiments of the present invention, the development tool 112 is a separate computing system from the computing platform 130. Alternatively, the development tool 112 is part of the computing platform 130, for example, a software executing on the computing platform 130. In other cases, the computing platform 130 can be considered as the development tool 112.

Figure 5:
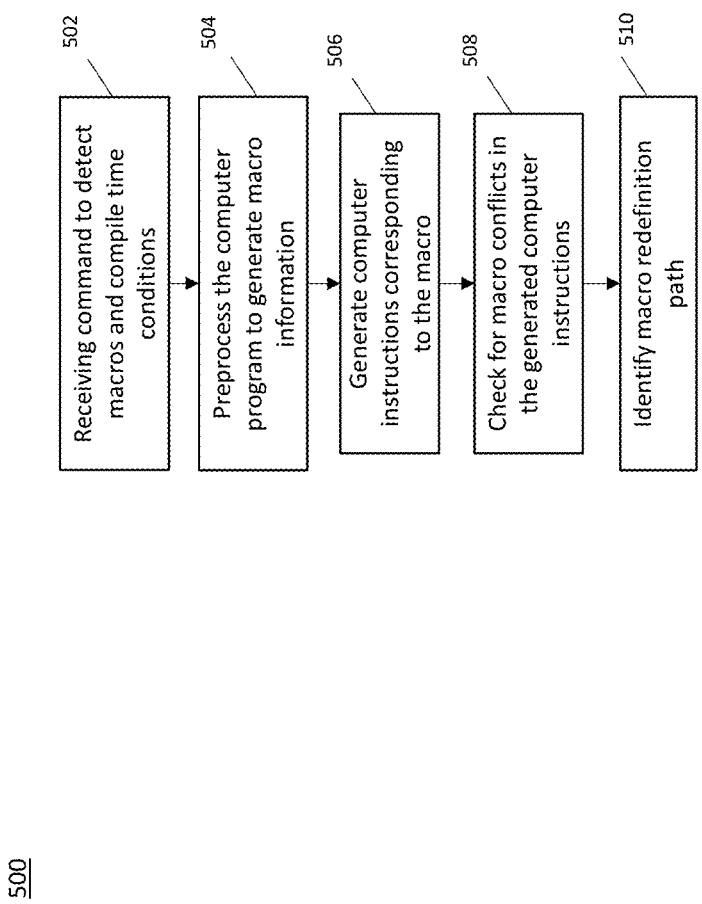
FIG. 5 depicts a flowchart of a method for detecting macros in a computer program and identifying paths of compile time conditions that can cause compilation errors and/or execution errors according to one or more embodiments of the present invention.

FIG. 5 depicts a flowchart of a method for detecting macros in a computer program and identifying paths of compile time conditions that can cause compilation errors and/or execution errors according to one or more embodiments of the present invention. The method 500 can be executed by the development tool 112. The method 500 includes receiving a command to compile detect the macros and compile time conditions at time of compiling the computer program 106, at block 502. For example, an option '-p' in the compiling command "gcc-DTARG-c a.c-p" triggers the compiler 110 to initiate the detection and generate the macro information 412 for the computer program 106. Alternatively, or in addition, the trigger could be based on an environment variable associated with the development tool 112, or the operating system of the computing platform 130.

At block 504, in response to the received command, the macro preprocessor 410 parses the computer program 106 to generate the macro information 412. The macro information 412 can identify FileName, MacroEnclosed, LineNoStart/LineNoEnd, PreprocessType, MacroName, AssignedMacroValue, EarlierAssignedMacroValue, SpecificMacroType, ReferredMacroName, CurrentMacroValue, etc. Filename indicates the name of the file 102, 103 that uses the macro 104. MacroEnclosed indicates whether the macro 104 has a compile time condition 202 associated with it. LineNoStart indicates a starting line number in the file 102, 103 where the computer instructions of the macro 104 start. LineNoEnd indicates an ending line number of the macro 104. PreprocessType indicates an action relative to the compile time condition 202. MacroName indicates a name associated with the macro 104, typically provided by the developer. AssignedMacroValue indicates a value assigned to the compile time condition 202. SpecificMacroType indicates a type of the compile time condition 202 and/or the macro 104. ReferredMacroName indicates another macro 104 that may be referred by the macro 104 that is being parsed. CurrentMacroValue indicates a present value of the compile time condition 202, which can be different from the value that was assigned previously.

Such information can be identified by syntactic and semantic parsing of the computer instructions in the source code files 102, 103 of the computer program 106. In some examples, the command can specify particular subset of source code files 102, 103 to be parsed to generate the macro information 412.

Figure 6:
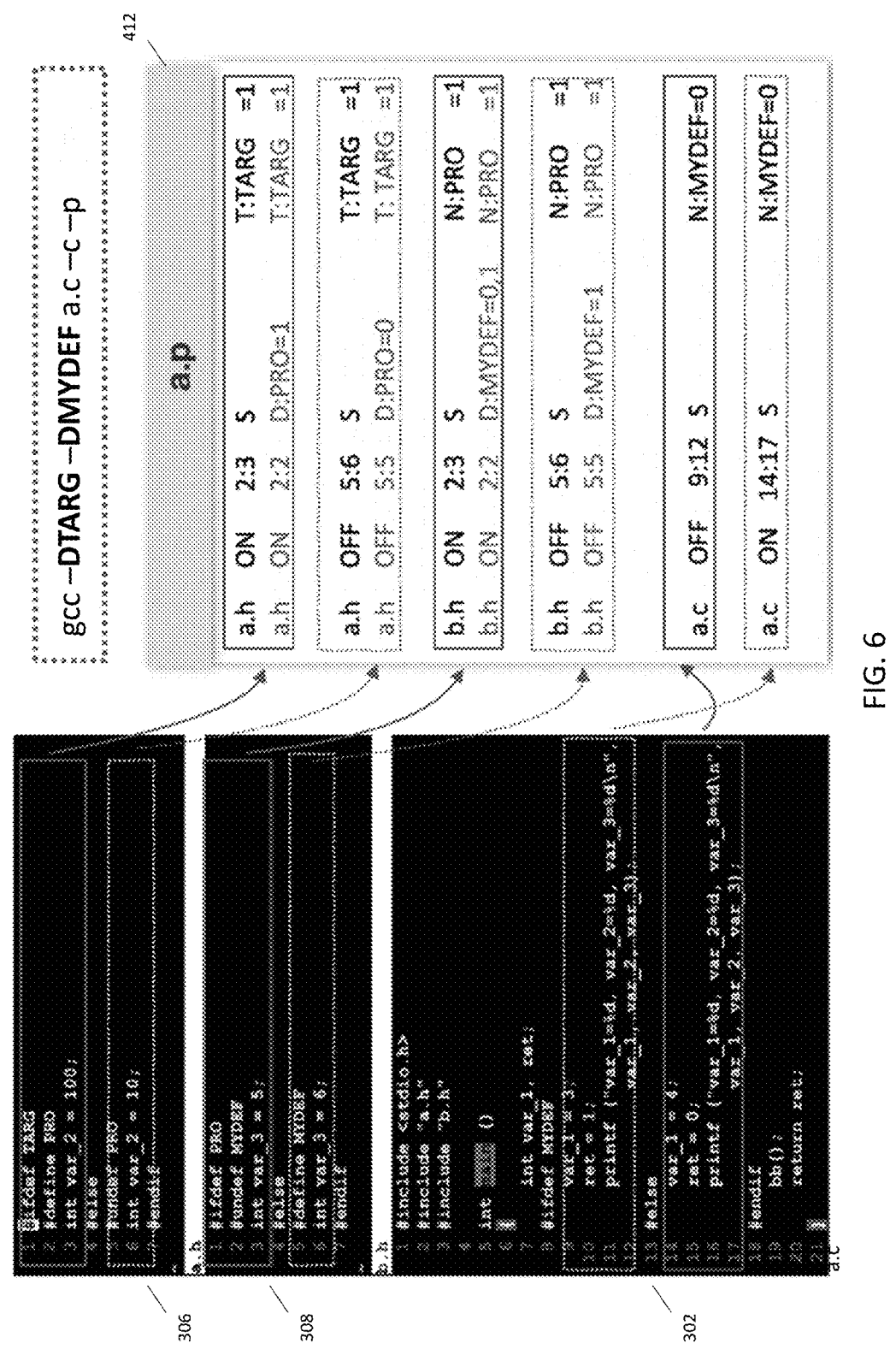

FIG. 6 depicts an example scenario of detecting macro information 412 according to one or more embodiments of the present invention. In FIG. 6, the macro information 412 is generated for the example files 302, 304, 306 based on the received command. It is understood that the macro information 412 can be stored in a different format than what is shown in FIG. 6. As shown, the macro information 412 is parsed to show the location of compile time conditions 202 in the source code files 302, 306, 308. Further, values assigned to the compile time conditions 202, either based on the received command or based on the source code is identified. Additionally, where applicable, a previous compile time condition 202 (in hierarchy) is also identified and a value assigned to that previous compile time condition 202 is also noted. For example, in case of the file "a.h" 302, the compile time condition 202 PRO is defined when the previous compile time condition 202 TARG is set to 1 (in the command line).

The macro information 412 that is generated is stored in memory in some embodiments of the present invention. Alternatively, or in addition, the macro information 412 is stored in a file. For example, a file "<program name>.p" is created that stores the macro information 412. In some embodiments of the present invention a filename to store the macro information 412 can be specified in the command to trigger the preprocessing.

Figure 7:
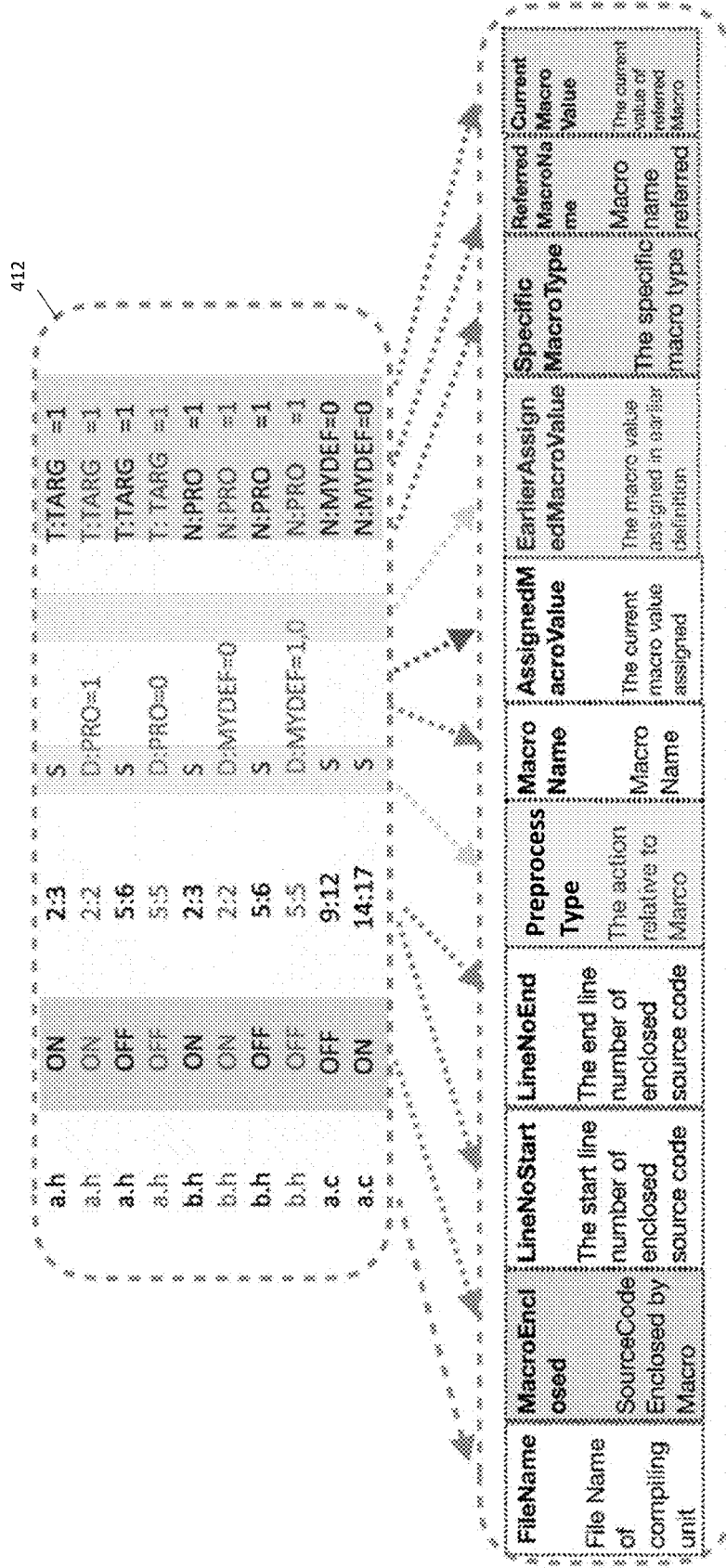
FIG. 7 depicts an example macro information according to one or more embodiments of the present invention.

FIG. 7 depicts an example macro information 412 according to one or more embodiments of the present invention. The macro information 412 that is depicted in FIG. 7 is the result of the macro processor 412 parsing the computer program 106 depicted in FIG. 6. As noted elsewhere, FileName denotes the name of the file using a macro 104, e.g., "a.c." MacroEnclosed 'ON' indicates that computer instructions are enclosed by a compile time condition 202, which after preprocessing are to be expanded/extracted. MacroEnclosed 'OFF' indicates that computer instructions are not enclosed by a compile time condition 202. LineNoStart and LineNoEnd indicate the start and end line numbers of the computer instructions enclosed by the macro 104, respectively. Preprocesstype 'S' marks the source code scope enclosed by the macro, whereas 'D' marks the definition of macros. MacroName is the name of the macro 104 defined. AssignedMacroValue is the value assigned to the compile time condition 202 when the compiler 110 is triggered. EarlierAssignedMacroValue is the value assigned to the compile time condition 202 that is triggered by the last/previous compile time condition 202 definition. SpecificMacroType 'T' indicates if the compile time condition 202 is related to the target computing platform 130, e.g., _MVS_ for ZOS®, AIX for AIX®. SpecificMacroType 'P' indicates if the macro 104 is relative to the target computing platform 130. ReferredMacroName provides the referred name of a compile time condition 202 used in computing a compile time condition 202 during the preprocessing. CurrentMacroValue is the current value of the compile time condition 202 in the corresponding condition check during the preprocessing.

It should be noted that the above provided examples of the various parameters in the macro information 412 are not exhaustive, and that in one or more embodiments of the present invention the parameters can have other values assigned.

Figure 8:
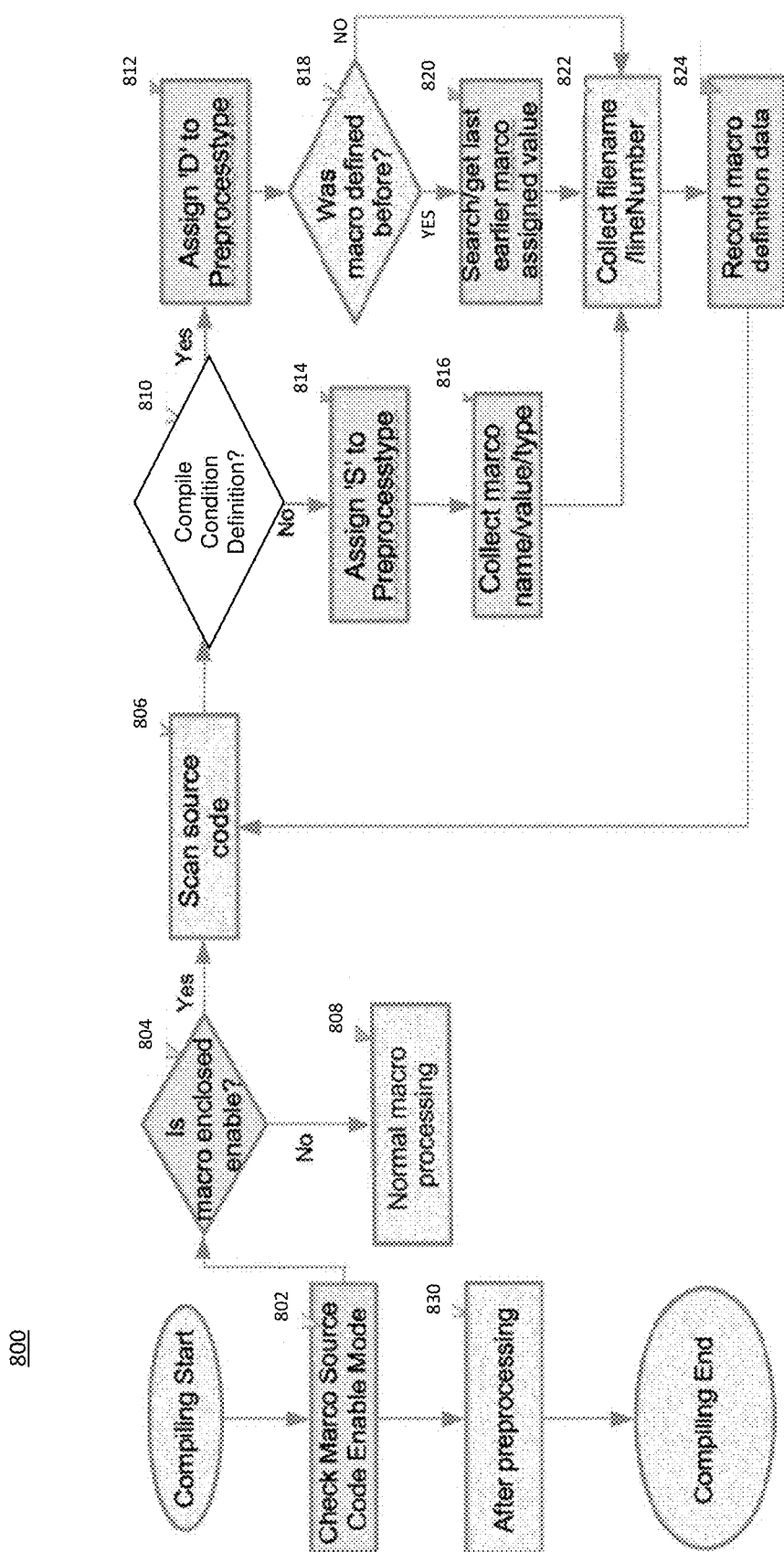
FIG. 8 depicts a flowchart of a method for generating the computer instructions for the macro 104 according to one or more embodiments of the present invention.

Referring to the flowchart of the method 500, at block 506 the compiler 110 compiles the computer instructions, which includes generating source code for the macro(s) 104, depending on the compile time conditions that enclose the macro. FIG. 8 depicts a flowchart of a method 800 for generating the computer instructions for the macro 104 according to one or more embodiments of the present invention. For explanation, the description herein includes a walkthrough of the example macro MYDEF 104 from FIG. 6 (lines 8-18 in file "a.c" 302).

Referring to the flowchart of method 800, the compiler 110 checks whether it is detecting macros has been enabled (block 502 of FIG. 5), at 802. At block 804, if the macro detection has been triggered, the compiler 110 scans the computer program 106 using the macro preprocessor 410 (at block 806), else, the compiler proceeds with typical macro processing according to existing solutions (at block 808).

At each computer instruction, the compiler 110 checks whether the present computer instruction is a definition of a compile time condition 202, at block 810. If the present computer instruction is a definition of a compile time condition 202 (e.g., "#undef MYDEF"), the compiler 110 assigns flag 'D' to the Preprocesstype, at block 812. Instead, if the computer instruction is a condition of a compile time condition 202 (e.g., "a.c" line 14-17), the compiler 110 assigns flag 'S' to Preprocesstype, at block 814. Further, in this case (flag S), the macro name, present value, and type are noted from the computer instruction, at block 816. Further, at block 810, there are computer instructions that are enclosed in the compile time condition 202, the MacroEnclosed is set to 'ON', (e.g., "a.c" line 14-19), otherwise, it is set to 'OFF' (e.g., "a.c" line 9-12). Macro information parameters including SpecificMacroType, ReferredMacroName, and CurrentMacroValue are also recorded at this time in one or more embodiments of the present invention.

In the case of encountering a definition of a compile time condition 202 (flag D), the compiler 110 checks if the compile time condition 202 (e.g., 'MYDEF') was defined before, at block 818. The check is performed by searching the macro name through the existing information in the macro information 412. If the compile time condition 202 was defined before, the compiler 110 searches and obtains the last value assigned to the compile time condition 202 (e.g., '1' in the ongoing example of MYDEF; 1 is passed by compiling command option '-DMYDEF'), at block 820. The obtained value is recorded into EarlierAssignedMacroValue.

The compiler 110 also collects the metadata associated with the macro 104 such as, file name, line numbers (start, end), etc., at block 822. The captured information is stored in the macro information 412 structure (e.g., separate file, database, memory, etc.), at block 824.

The compiler 110 repeats this process for each computer instruction in the computer program 106, and at least for macros 104 in the computer program. Once all of the macros 104 have been processed in this manner and the macro information 412 is captured, the compiler 110 continues to expand the macros 104 and compile the computer instructions in the computer program 106 as it typically does, at block 830.

Figure 9:
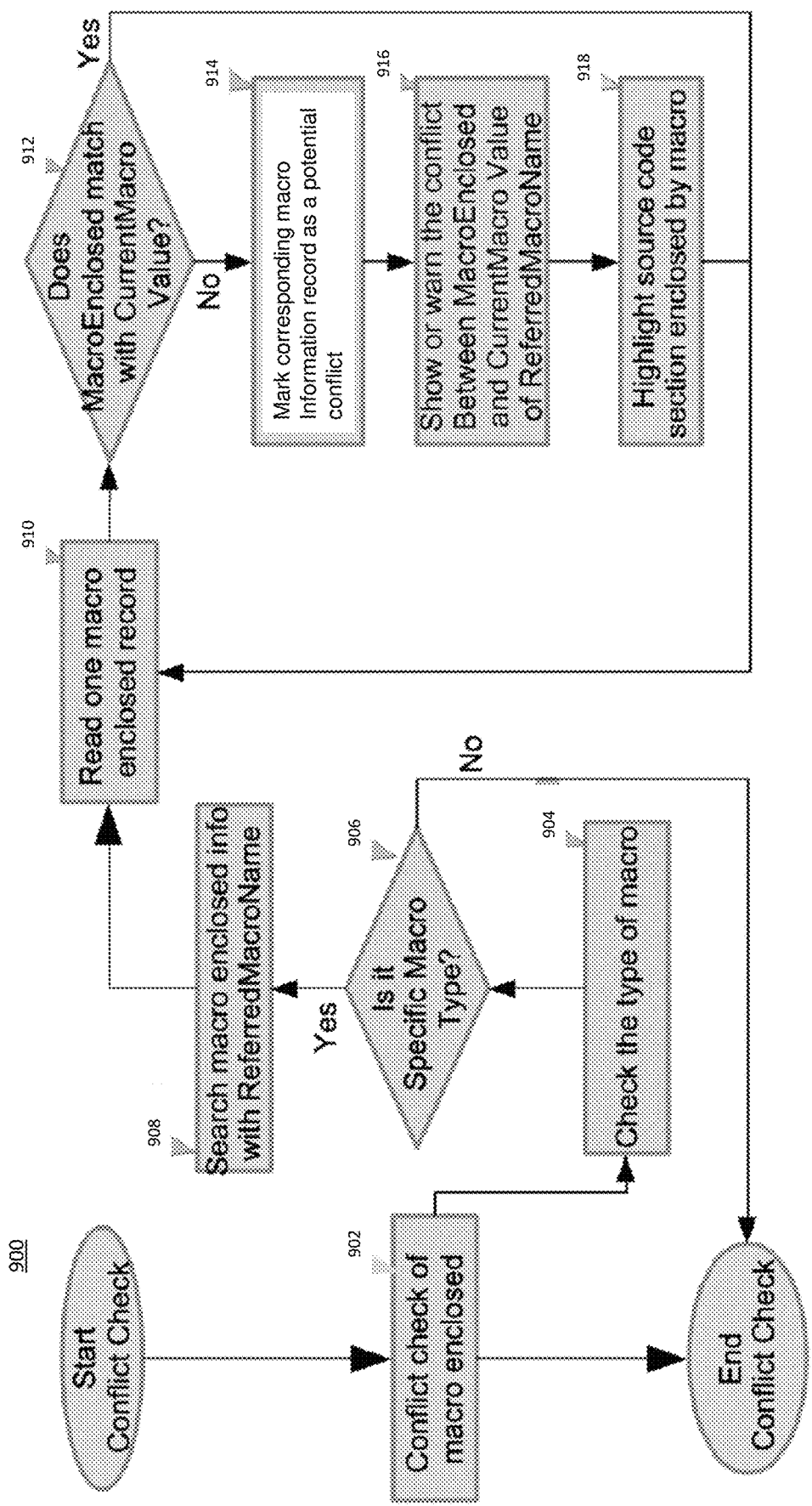
FIG. 9 depicts a flowchart of a method for operations performed for checking the macro conflicts according to one or more embodiments of the present invention.

Continuing with the flowchart of the method 500, at block 508, macro conflicts are checked in the source code that is expanded by the compiler 110. FIG. 9 depicts a flowchart of a method 900 for operations performed for checking the macro conflicts according to one or more embodiments of the present invention. For explanation, the description herein includes a walkthrough of the example macro MYDEF 104 from FIG. 6 (lines 8-18 in file "a.c" 302). In this example, the definition of macro 'MYDEF' is passed as part of the compiling command. Consider that, all computer instruction that meet the condition including 'MYDEF' being defined are to be expanded in the object 112, however, the computer instructions in the file 'a.c' 302 lines 9-10 are not expanded, and hence not compiled.

The conflict checking facilitates identifying the root cause of the conflict between a macro 104 that is to be enclosed, but is not because of conflicting compile time conditions 202, as in this case. At blocks 902, 904, the compiler 110 selects the macro to be checked and checks it specific macro type, (i.e., the macro type is 'T' (target), or set by the user). In this example, 'MYDEF' is the selected macro to check. If the type of macro 104 is not a predetermined type, (such as 'T'), the conflict check does not have to be performed, at block 906.

If the macro 104 is of the predetermined type(s), the compiler 110 searches macro information 412 for the ReferredMacroName (e.g., 'MYDEF'), at block 908. In the example of file "a.c" 302, two records are identified (lines 8-12, and lines 12-16, which both use MYDEF in compile time condition 202).

At blocks 910 and 912, the next macro information 412 is read and the current value of the compile time condition 202 associated with the macro 104 is checked with the current value. If the compile time condition 202 is satisfied, the next record(s) are checked for conflicts in the same manner (repeat block 910). Alternatively, if the compile time condition 202 has an ambiguous evaluation (e.g., values switched between 1 and 0), the compiler 110 denotes the record in the macro information 412 as a potential conflict, at block 914.

Further, at block 916, the development tool 112 notifies the user of the potential conflict. The notification can be a popup window, a message, or any other type of electronic notification. Further, in the development tool 112, the computer instructions associated with the macro 104 are marked, at block 918. The marking can be performed by highlighting the computer instructions, for example, by changing one or more of: a foreground color, a background color, a font, etc. Alternatively, or in addition, the marking can include changing a border, annotations, etc. associated with the computer instructions of the macro 104. The method 900 is repeated for any additional records (block 910) of the macro 104.

In addition, the development tool also marks computer instructions associated with other compile time conditions 202 which trigger the conflict (e.g., compile time condition 'PRO=0' impacts 'MYDEF'). The other compile time conditions 202 that interact with the macro 104 being checked can be identified from the macro information 412 record for the macro 104. For example, the macro information 412 can be searched to get the definition of the other compile time condition 202 (e.g., 'PRO').

In one or more examples, the user can specify one or more target macros 104 for which the conflicts are to be checked, for example, via the initiating command. Alternatively, or in addition, every distinct macro 104 is checked for conflicts in this manner.

Figure 10:
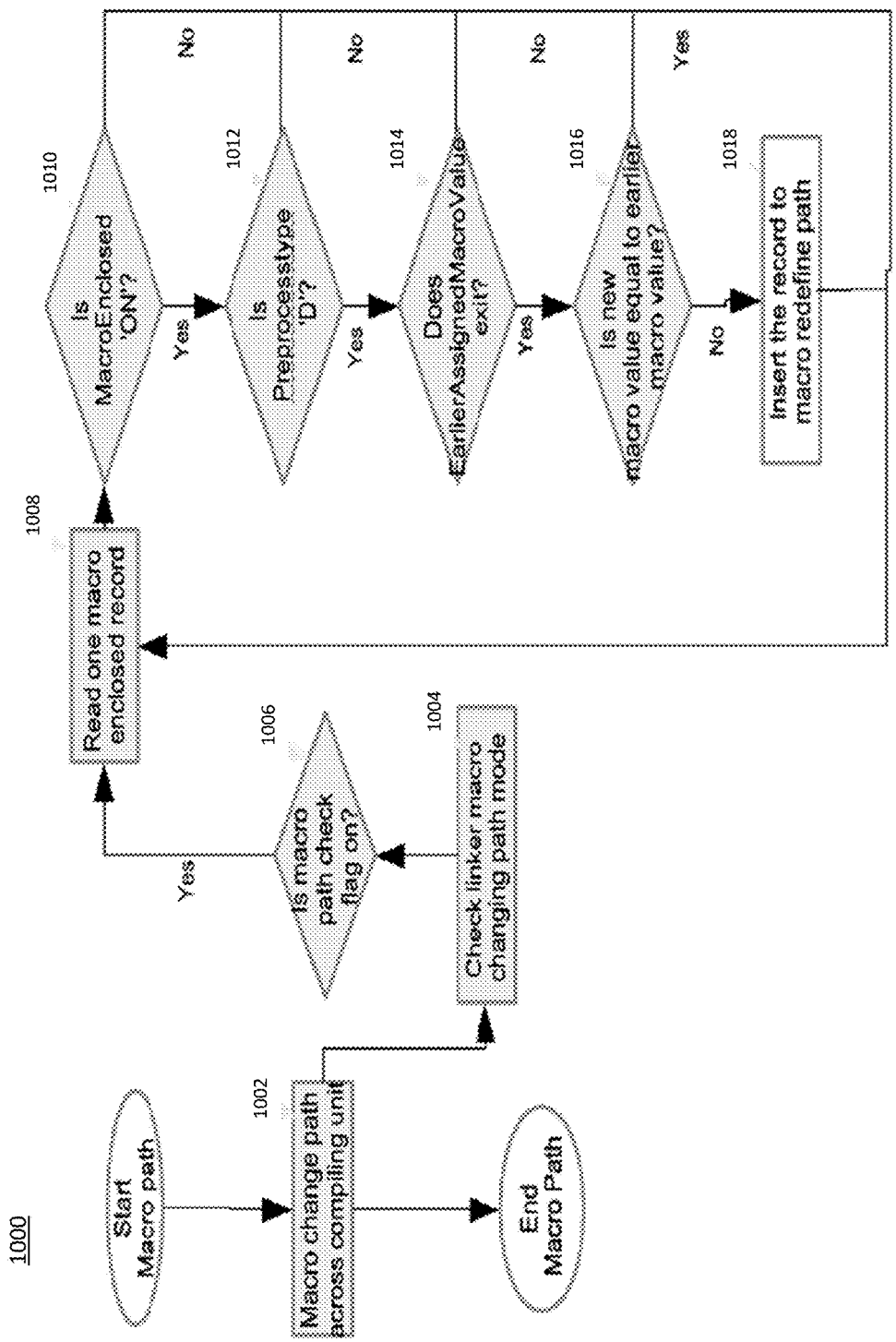
FIG. 10 depicts a flowchart of a method for macro redefinition path support according to one or more embodiments of the present invention.

Referring to the flowchart of method 500, once the conflicting macros are highlighted, at block 510, the development tool provides support for macro redefinition path. FIG. 10 depicts a flowchart of a method 1000 for macro redefinition path support according to one or more embodiments of the present invention. For explanation, the description herein includes a walkthrough of the example macro MYDEF 104 from FIG. 6 (lines 8-18 in file "a.c" 302).

The method 1000 includes, at block 1002, initiating a path-change detection of a macro 104, where the macro is defined in one file and used in one or more other files in the computer program 106. Further, a macro path-check option of the linker 406 is checked, at block 1004. If macro path-check option is not switched ON, for example, via the initiating command (block 502), via an environment variable, or any other setting that the linker 406 can check, the path change detection is terminated, at block 1006. Alternatively, if the setting is switch ON, a record from the macro information 412 is read for further analysis, at block 1008.

The analysis includes checking at least four conditions. Is MacroEnclosed ON (1010); is PreprocessType=D (1012); does EarlierAssignedMacroValue exists (1014); and is new compile time condition value equal to previous compile time condition value (1016). Based on the outcome of each of these condition checks, the record can be deemed to require a redefining a path, i.e., where the compile time condition is set and where it is used, at block 1018. This process is repeated for every record in the macro information 412.

In the ongoing example scenario, the value '1' of macro 'MYDEF' is passed from the option '-DMYDEF' in the compiling command. Considering that the path check is to be performed a records from files 'a.p'/'b.p' is read. If the value of MacroEnclosed is 'ON' (1010) then 'b.h' line 2 is read, else, 'b.h' line 5-6 are read. Further, if the value of Preprocesstype is 'D' (1012), one set of computer instructions are to be used (i.e, 'b.h' line 2); else, a second set of computer instructions is to be used (i.e., 'b.h' line2-3). Next, if EarlierAssignedMacroValue exists (1012), (i.e., PRO exists per 'b.h' line 2); else other option has to be performed (i.e., 'b.h' line5). Further, if new value of compile time condition 202 is equal to earlier macro value (1016), then use the compile time condition 202 value (i.e., 'b.c' line3); else, if the values do not match, the record is marked for macro redefinition path.

The technical solutions described herein provide a practical application to support source code macro analysis by identifying and using macro information, which includes determining MacroEnclosed, CurrentMacroValue, Preprocesstype, and EarlierAssignedMacroValue, among other parameters as part of a record for each macro and compile time condition. In one or more embodiments of the present invention, a preprocessor collects and generates the macro information records for all macros in a computer program, and identifies computer instructions that are enclosed or unenclosed based on the macro definition. A compiler and/or linker analyzes the macro information to detect macro definition conflicts by comparing MacroEnclosed status and CurrentMacroValue of the user-specified or default specified type macro. The tools then search records in the macro information to determine the corresponding definition of macros which make possible impact. Further, the linker supports the macro redefinition path across compiling units, e.g., files, by locating the records of macro information with the status of MacroEnclosed and the value of Preprocesstype, determining the valid redefinition after comparing AssignedMacroValue and EarlierAssignedMacroValue.

The technical solutions described herein provide an improvement to computing technology, and particularly debugging. In one or more embodiments of the present invention, technical solutions herein facilitate to analyze/figure out the root cause of macro conflict which causes one or more computer instructions to not be compiled into object file as expected and give macro redefinition warning across compiling units, e.g., files. The technical solutions herein also increase the efficiency of the root cause locating using the macro information. The technical solutions herein also improve identifying macro redefinition for developers, especially for large enterprise opensource projects with complicated macros used. The technical solutions facilitate an editor/GUI to provide readable and more user-friendly views of the macros and compile time conditions that cause conflicts during compilation.

The technical solutions described herein can be, or can be part of compilers and IDEs, like ECLIPSE®, VISUAL STUDIO®, etc. It is understood that although examples herein are described using a particular computer programming language, the technical solutions herein are not limited to any particular computer programming language.

Figure 11:
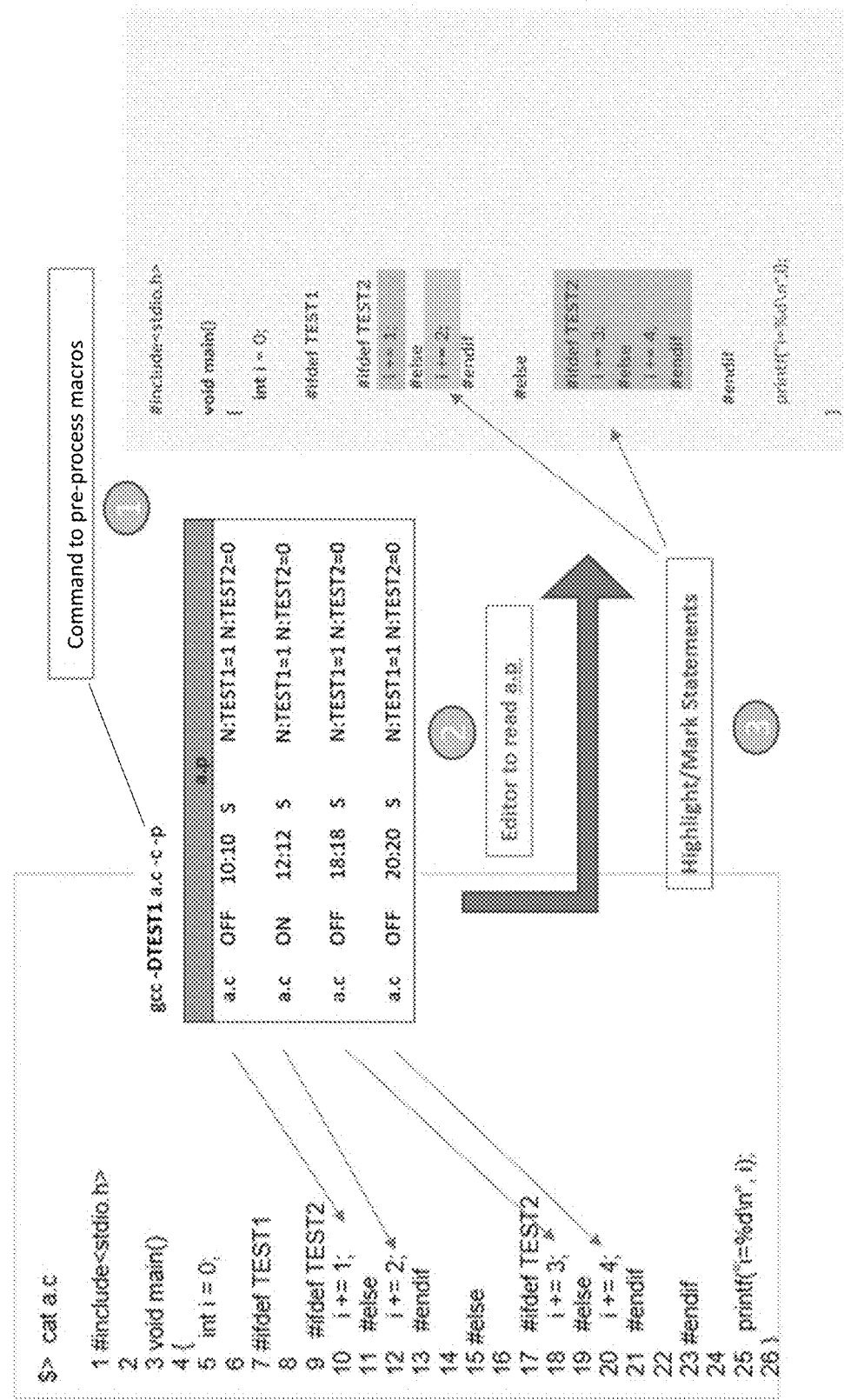
FIG. 11 depicts an example output according to one or more embodiments of the present invention.
Figure 12:
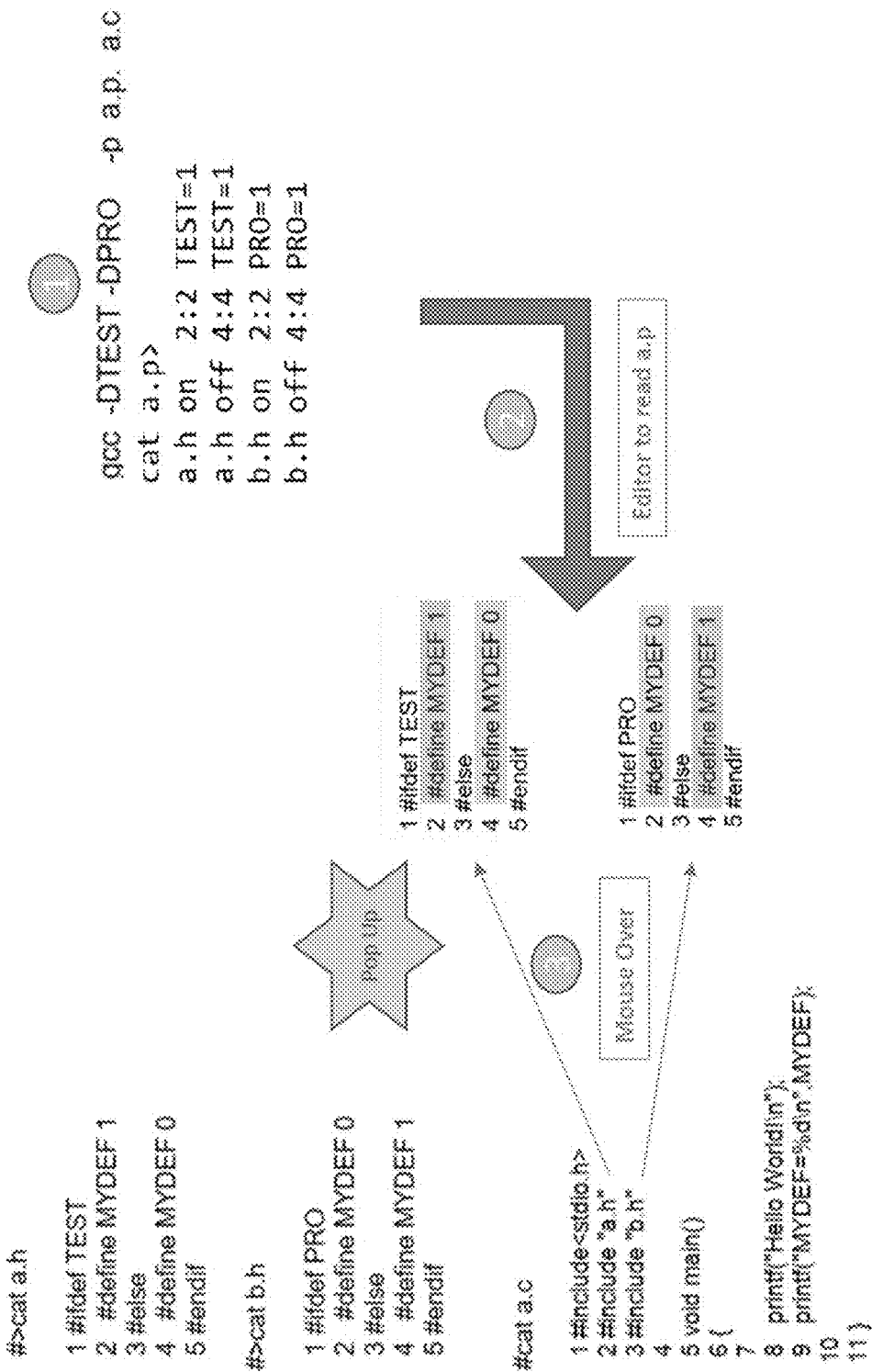
FIG. 12 shows another output according to one or more embodiments of the present invention.

FIG. 11 depicts an example output according to one or more embodiments of the present invention. The file 'a.c' is analyzed to generate the macro information in response to a command to preprocess the computer program (step 1). The macro information is read by the editor to highlight/mark one or more computer instructions in the computer program (steps 2, 3). FIG. 12 shows another output according to one or more embodiments of the present invention. Here, file 'a.h' is preprocessed in response to a command to generate the macro information. The macro information is used to display pop ups to the user with notifications. Alternatively, or in addition, during user interaction with the computer program, even with a different file, the computer instructions that will be part of the object code are marked, for example, on mouse-over or other such user interactions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
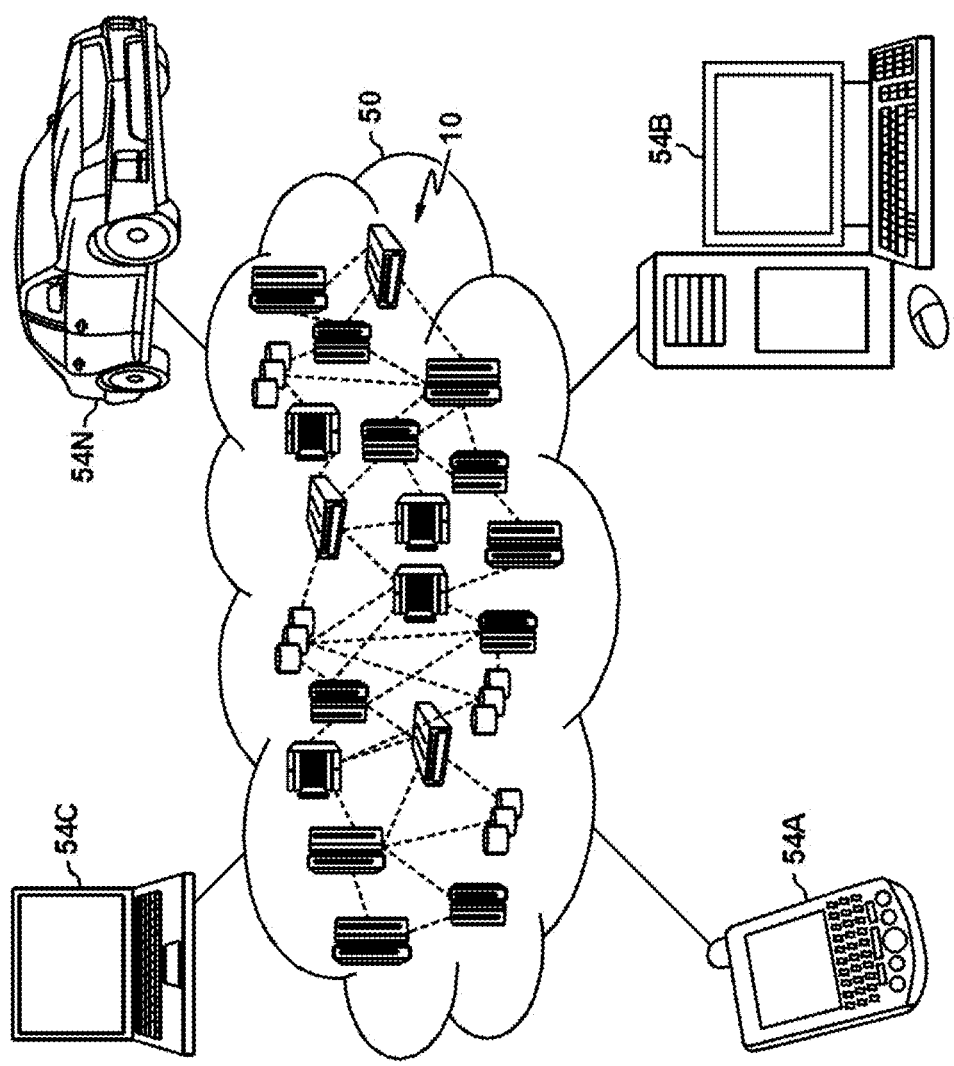
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
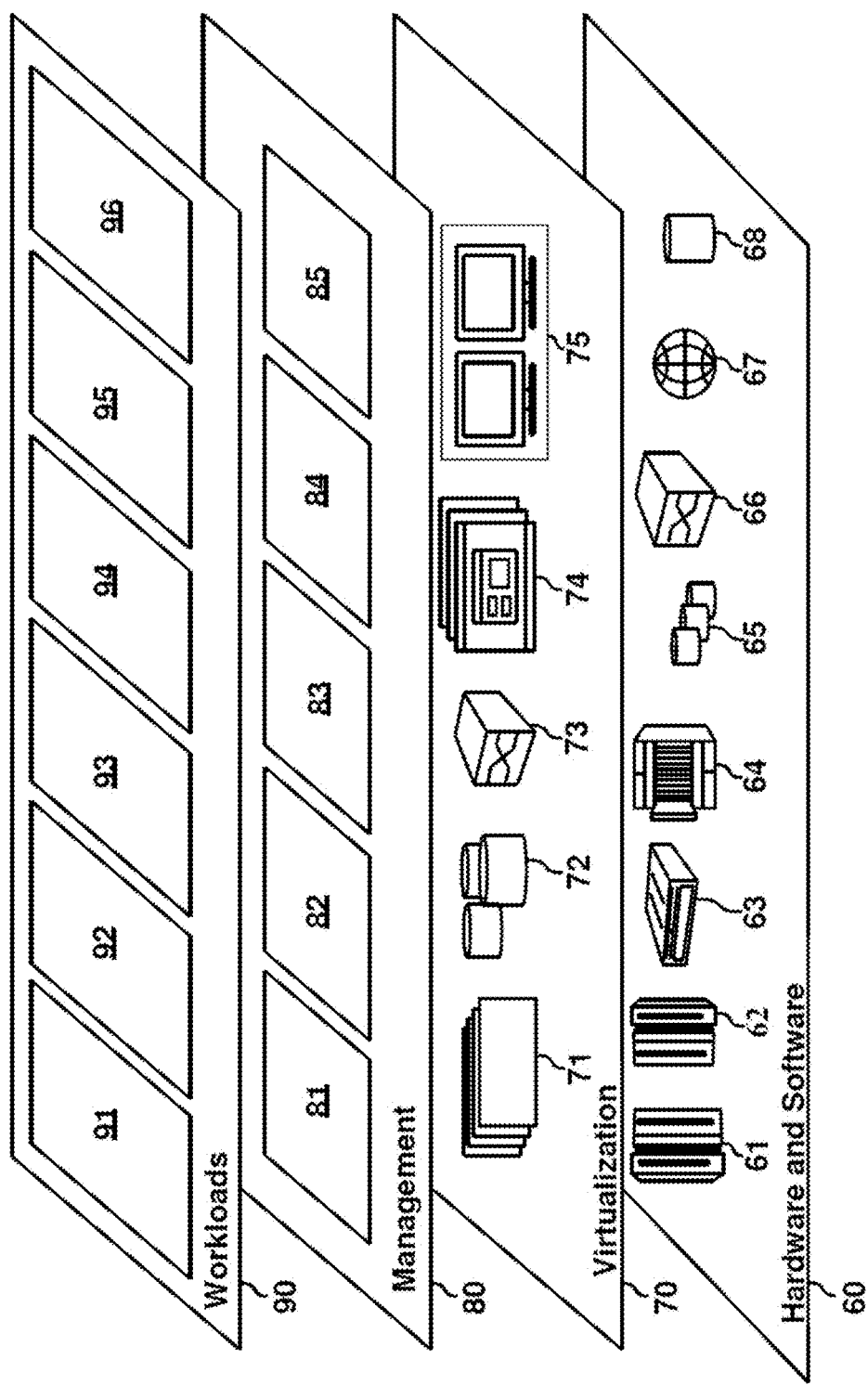
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer program processing and analyzing 96.

Figure 15:
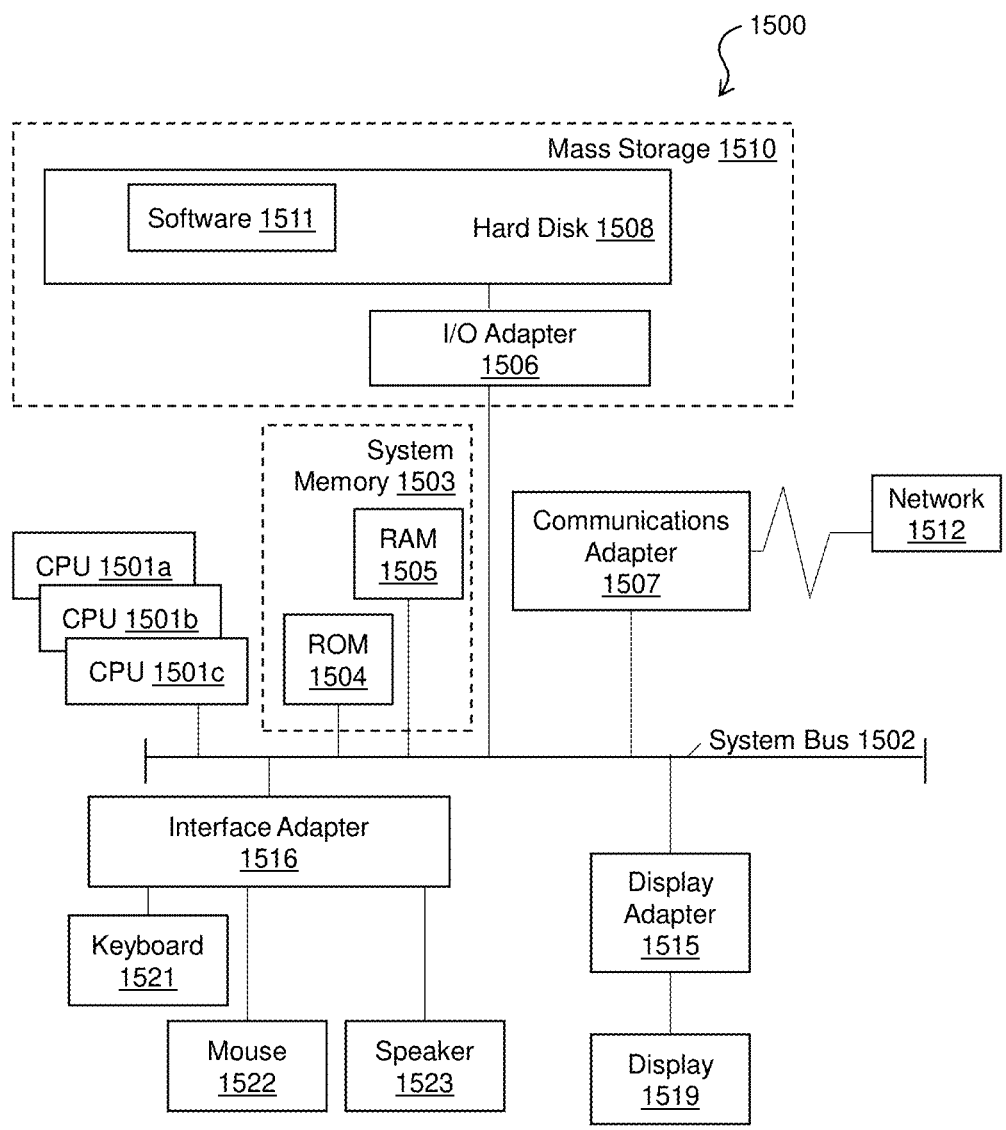
FIG. 15 depicts a computing system according to one or more embodiments of the present invention.

Turning now to FIG. 15, a computer system 1500 is generally shown in accordance with an embodiment. The computer system 1500 can be the target computing platform 130, the development tool 112, or any other component used herein. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 15.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 15, the computer system 1500 includes processing capability in the form of the processors 1501, and, storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 15 is not intended to indicate that the computer system 1500 is to include all of the components shown in FIG. 15. Rather, the computer system 1500 can include any appropriate fewer or additional components not illustrated in FIG. 15 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   preprocessing, by a compiler, a plurality of macros in a computer program, wherein preprocessing a macro comprises:
   identifying a compile time condition associated with the macro, wherein the compile time condition indicates a combination type of hardware and software of a target computing platform of the computer program;
   determining a current value of the compile time condition at the time of compiling a computer instruction and a previous value of the compile time condition;
   determining a set of computer instructions enclosed by the macro; and
   storing a macro information record that includes the compile time condition, the current value and the previous value of the compile time condition, a name of a source code file of the computer program that includes the macro, and an identification of the set of computer instructions enclosed by the macro.

2. The computer-implemented method of claim 1, further comprising receiving, by the compiler, an instruction to preprocess the macros in the computer program.

3. The computer-implemented method of claim 2, wherein the instruction includes a target macro, and the computer-implemented method further comprises:
   detecting a conflict of the target macro with a second macro because of the compile time condition associated with the target macro and the second macro, wherein the target macro and the second macro change the value of the same compile time condition.

4. The computer-implemented method of claim 3, further comprising displaying a notification indicative of the detected conflict between the target macro and the second macro.

5. The computer-implemented method of claim 1, further comprising marking the set of computer instructions enclosed by the macro depending on the current value, wherein the current value indicates a status of including the set of computer instructions in an object code of the computer program.

6. The computer-implemented method of claim 1, further comprising:
checking an execution path of a macro at time of linking object code of the computer program, wherein the checking the execution path comprises:
determining whether the macro comprises evaluating the compile time condition to expand the set of computer instructions;
determining whether the macro has a particular type of preprocessor;
determining whether another compile time condition causes the value of the macro to change; and
determining whether the previous value of the macro and the current value of the macro match.

7. The computer-implemented method of claim 1, wherein the macro is defined in a first file of the computer program and used in a second file of the computer program.

8. A system comprising:
a memory device; and
one or more processing units coupled with the memory device, the one or more processing units are configured to perform a method for preprocessing a plurality of macros in a computer program, wherein preprocessing a macro comprises:
identifying a compile time condition associated with the macro, wherein the compile time condition indicates a combination type of hardware and software of a target computing platform of the computer program;
determining a current value of the compile time condition at the time of compiling a computer instruction, and a previous value of the compile time condition;
determining a set of computer instructions enclosed by the macro; and
storing a macro information record that includes the compile time condition, the current value and the previous value of the compile time condition, a name of a source code file of the computer program that includes the macro, and an identification of the set of computer instructions enclosed by the macro.

9. The system of claim 8, further comprising receiving, by a compiler, an instruction to preprocess the macros in the computer program.

10. The system of claim 9, wherein the instruction includes a target macro, and the system further comprises:
detecting a conflict of the target macro with a second macro because of the compile time condition associated with the target macro and the second macro, wherein the target macro and the second macro change the value of the same compile time condition.

11. The system of claim 10, further comprising displaying a notification indicative of the detected conflict between the target macro and the second macro.

12. The system of claim 8, further comprising marking the set of computer instructions enclosed by the macro depending on the current value, wherein the current value indicates a status of including the set of computer instructions in an object code of the computer program.

13. The system of claim 8, further comprising:
checking an execution path of a macro at time of linking object code of the computer program, wherein the checking the execution path comprises:
determining whether the macro comprises evaluating the compile time condition to expand the set of computer instructions;
determining whether the macro has a particular type of preprocessor;
determining whether another compile time condition causes the value of the macro to change; and
determining whether the previous value of the macro and the current value of the macro match.

14. The system of claim 8, wherein the macro is defined in a first file of the computer program, and used in a second file of the computer program.

15. A computer program product comprising a computer-readable memory that has computer-executable instructions stored thereupon, the computer-executable instructions when executed by a processor cause the processor to perform a method for preprocessing a plurality of macros in a computer program, wherein preprocessing a macro comprises:
identifying a compile time condition associated with the macro, wherein the compile time condition indicates a combination type of hardware and software of a target computing platform of the computer program;
determining a current value of the compile time condition at the time of compiling a computer instruction, and a previous value of the compile time condition;
determining a set of computer instructions enclosed by the macro; and
storing a macro information record that includes the compile time condition, the current value and the previous value of the compile time condition, a name of a source code file of the computer program that includes the macro, and an identification of the set of computer instructions enclosed by the macro.

16. The computer program product of claim 15, further comprising receiving, by a compiler, an instruction to preprocess the macros in the computer program.

17. The computer program product of claim 16, wherein the instruction includes a target macro, and the system further comprises:
detecting a conflict of the target macro with a second macro because of the compile time condition associated with the target macro and the second macro, wherein the target macro and the second macro change the value of the same compile time condition.

18. The computer program product of claim 17, further comprising displaying a notification indicative of the detected conflict between the target macro and the second macro.

19. The computer program product of claim 15, further comprising marking the set of computer instructions enclosed by the macro depending on the current value, wherein the current value indicates a status of including the set of computer instructions in an object code of the computer program.

20. The computer program product of claim 15, further comprising:
checking a redefinition path of a macro at time of linking object code of the computer program, wherein the checking the redefinition path comprises:
determining whether the macro comprises evaluating the compile time condition to expand the set of computer instructions;

determining whether the macro has a particular type of preprocessor;
determining whether another compile time condition causes the value of the macro to change; and
determining whether the previous value of the macro and the current value of the macro match.

\* \* \* \* \*